United States Patent
Machatzke et al.

[15] 3,682,978
[45] Aug. 8, 1972

[54] ANTHRAQUINONE DYESTUFFS

[72] Inventors: Heinz Machatzke, Union, N.J.; Josef Singer, Leverkusen, Germany

[73] Assignee: Farbenfabriken Bayer Aktiengesellschaft, Leverkusen, Germany

[22] Filed: June 4, 1969

[21] Appl. No.: 830,524

[30] Foreign Application Priority Data

June 15, 1968  Germany..........P 17 69 612.7

[52] U.S. Cl. ..........................260/372, 8/39, 260/377
[51] Int. Cl. ..............................C09b 1/52, C09b 1/56
[58] Field of Search.........................................260/372

[56] References Cited

UNITED STATES PATENTS 3,519,656  7/1970  Schwander................260/372

*Primary Examiner*—Lorraine A. Weinberger
*Assistant Examiner*—E. Jane Skelly
*Attorney*—Plumley & Tyner

[57] ABSTRACT

The invention relates to new sulphonic acid group-containing anthraquinone dyestuffs of the general formula

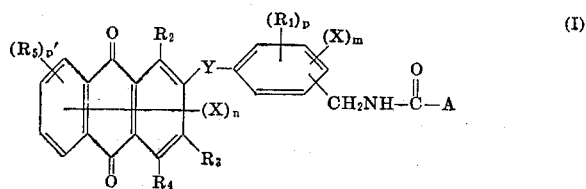

in which
A stands for an optionally substituted alkyl, cycloalkyl, alkylamine, cycloalkylamine, alkyloxy or cycloalkyloxy radical; for an optionally substituted, preferably sulphonated, arylamine or aryloxy radical; for an optionally substituted aralkyl, aralkylamine or aralkyloxy radical preferably sulphonated in the aromatic part; or for an amino group,
Y represents a direct linkage or a bridge member,
$R_1$ to $R_5$ denote, independently of one another, hydrogen, Halogen (Cl, Br, F), $-NO_2$, $-NH_2$, NH—alkyl, —NH-aryl, —NH—acyl, —O—alkyl, O—aryl, —OH, —S—alkyl, —S—aryl, —$SO_2$NH—alkyl, —$SO_2$N(alkyl)$_2$, —$SO_2$NH-aryl, —$SO_2$—alkyl, —$SO_2$—aryl, —aryl.
$R_1$ may also stand for a lower alkyl radical, the radicals
X denote sulphonic acid groups, $p$ and $p'$ represent the number 1, 2 or 3, $m$ denotes the number 0, 1 or 2, and $n$ represents the number 0, 1 or 2, the sum total of $m$ and $n$, in addition to the sulphonic acid groups which may be contained in the radical A, being at least 1.

10 Claims, No Drawings

ANTHRAQUINONE DYESTUFFS

The invention relates to new sulphonic acid group-containing anthraquinone dyestuffs of the general formula

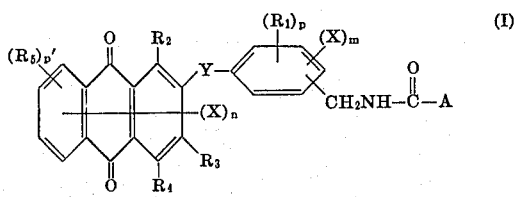

in which

A stands for an optionally substituted alkyl, cycloalkyl, alkylamine, cycloalkylamine, alkyloxy or cycloalkyloxy radical;
for an optionally substituted, preferably sulphonated, arylamine or aryloxy radical;
for an optionally substituted aralkyl, aralkylamine or aralkyloxy radical preferably sulphonated in the aromatic part; or for an amino group, Y represents a direct linkage or a bridge member, $R_1$ to $R_5$ denote, independently of one another, hydrogen, Halogen (Cl, Br, F), —$NO_2$, —$NH_2$, NH—alkyl, —NH—aryl, —NH—acyl, —O—alkyl, O—aryl, —OH, —S—alkyl, —S—aryl, —$SO_2NH$—alkyl, —$SO_2N$(alkyl)$_2$, —$SO_2NH$—aryl, —$SO_2$—alkyl, —$SO_2$—aryl, —aryl.

$R_1$ may also stand for a lower alkyl radical, the radicals

X denote sulphonic acid groups, p and p' represent the number 1, 2 or 3, m denotes the number 0, 1 or 2, and n represents the number 0, 1 or 2, the sum total of m and n, in addition to the sulphonic acid groups which may be contained in the radical A, being at least 1.

For the radical A the following individual examples may be mentioned:
for the optionally substituted alkyl radical: straight-chain or branched alkyl radicals with one to 12, preferably with one to seven, carbon atoms; as well as cycloalkyl radicals with preferably five or six carbon atoms; these radicals may also contain multiple bonds;
for the optionally substituted alkylamine or alkyloxy radical those with one to 12, preferably one to eight, carbon atoms in the straight-chain or branched carbon chain which may also be unsaturated; as well as cycloalkylamine radicals with preferably five or six carbon atoms, these radicals may also contain multiple bonds;
for the optionally substituted, preferably sulphonated, arylamine or aryloxy radical: a mono- or polycyclic radical, such as a radical of the benzene, naphthalene, diphenyl and the diphenyl-methane series;
for the optionally substituted, preferably sulphonated, aralkyl, aralkylamine or aralkyloxy radical those which contain in the aromatic part the afore-mentioned mono- and polycyclic radicals, and in the aliphatic part one to 12, preferably one to seven, carbon atoms, the aliphatic part possibly also containing multiple bonds.

The radicals mentioned for A and also those mentioned for $R_1$ to $R_5$, which are suitable for a substitution, may carry further substitutents, e.g. alkyl radicals with one to four carbon atoms; halogen atoms, such as fluorine, chlorine or bromine; nitro, cyano and hydroxy groups; alkoxy groups with preferably one to four carbon atoms; a cycloalkyloxy radical with preferably five or six carbon atoms; an optionally substituted phenoxy radical (substituents are preferably halogen, such as fluorine, chlorine, bromine; $C_{1-4}$ alkyl or alkoxy radicals, cyano, nitro, $SO_3H$— or carboxyl groups); lower alkylsulphonyl groups, arylsulphonyl, preferably phenylsulphonyl, groups, trifluoromethyl radicals, carboxylic acid and sulphonic acid groups as well as their esters, preferably $C_1 - C_6$ alkyl esters, the alkyl groups of which may carry one or more substituents, preferably hydroxy and lower alkoxy radicals; amino groups, mono- or dialkyl-amino groups each containing one to four carbon atoms, cycloalkylamino groups (preferably containing five or six carbon atoms), arylamino groups, the aryl radical preferably being a phenyl group which may be substituted by one or more halogen atoms, such as fluorine, chlorine or bromine, furthermore by $C_{1-4}$ alkyl or alkoxy radicals, cyano, nitro, sulphonic acid or carboxyl groups; acylamino groups, especially those with aliphatic or optionally substituted aromatic acyl radicals, such as acetyl, propionyl, benzoyl, lower alkylsulphonyl radicals or phenylsulphonyl radicals; alkyl thioether radicals or optionally substituted phenyl thioether radicals; optionally substituted carboxamide or sulphonamide groups as well as acylated sulphonamide groups, such as the disulphimide group.

Examples for the bridge member Y are the following: an O or S atom, the groups NH, —NH—alkylene—, —O—alkylene—, —S—alkylene—, —CONH—, —CONH—alkylene—, —$SO_2$—NH—, —$SO_2O$—, —$SO_2NH$—alkylene—, —O—alkylene—O—, —O—alkylene—S—, —O—alkylene-NH-, —S—alkylene—S—, —S—alkylene—NH—, —NH—alkylene—NH—, the alkylene chains possibly being interrupted by one or more hetero atoms and containing up to 12 carbon atoms, and the above-mentioned alkyl, acyl and aryl radicals possibly carrying further substituents.

Among the radicals mentioned for $R_1$ to $R_5$, the radical $R_3$ can obviously also be the radical

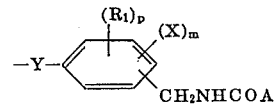

in which A, $R_1$, X, p and m have the same meaning as above.

The new anthraquinone dyestuffs are obtained by various methods of preparation.

1. Anthraquinone dyestuffs of the formulae

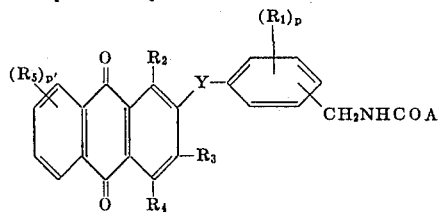

and (II)

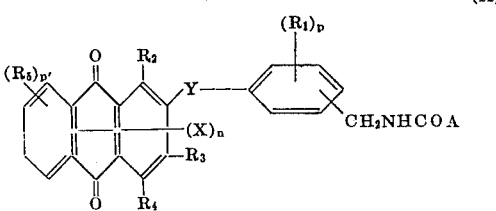

(III)

in which, $n$, $p$, $p'$, A, X, Y, and $R_1$ to $R_5$ have the same meaning as those given for the formula (I), are sulphonated, for example, by introduction into and stirring in concentrated, anhydrous or $SO_3$—containing sulphuric acid, at temperatures of about 0° to about 150° C, optionally with the addition of boric acid or dry sodium sulphate, according to the processes customary in anthraquinone chemistry.

2. Anthraquinone dyestuffs of the formula

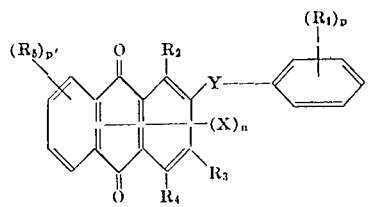

(IV)

in which $n$, $p$, $p'$, X, Y and $R_1$ to $R_5$ have the same meaning as that given for the formula (I), are condensed in the right-hand side of the phenyl nucleus with methylol amides of the formula $$HO-CH_2-NHCOA \qquad (V)$$

in which A has the same meaning as that given for the formula (I), or with functional derivatives of those methylol amides which are capable of reacting in the same way as the methylol amides, with the formation of dyestuffs of the formula (I), for example, in the presence of strong acids, for example, 80 to 100 percent sulphuric acid, 80 to 100 percent phosphoric acid, or acetic acid/hydrochloric acid mixtures.

3. Anthraquinone compounds of the formula

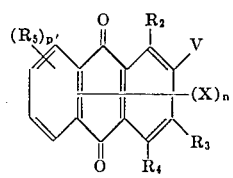

(VI)

in which X, $R_2$, $R_3$, $R_4$ and $R_5$, $n$ and $p'$ have the same meaning as that given for the formula (I), and V represents a splittable group, for example, and in particular, an aryloxy group, such as the phenyloxy group, or a halogen atom, e.g. Br, are condensed with derivatives of the formula

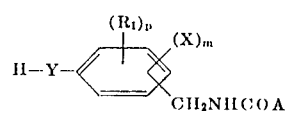

(VII)

in which $R_1$, $p$, X, $m$, A and Y have the same meaning as that given for the formula (I),
with the splitting off of V–H and with the formation of dyestuffs of the formula (I). For this purpose the compounds VI, preferably with an excess of compounds (VII), can be condensed in an alkaline, organic or organic/aqueous or aqueous medium at an elevated temperature, e.g. at temperatures of about 80° – 150° C.

The new anthraquinone dyestuffs (I) contain by definition at least one sulphonic acid group in the anthraquinone nucleus and/or in the phenyl nucleus. This water-solubilizing substituent is, as explained above, introduced into the dyestuffs in such a manner that it is present in the anthraquinone compound used as reaction component or, advantageously, introduced by sulphonation only during or after the condensation reaction. If the sulphonic acid group is already contained in the radical A before the condensation according to the method of production (2) or (3), then the additional sulphonation can be omitted.

Examples of suitable anthraquinone starting compounds (II) or (III) are the following

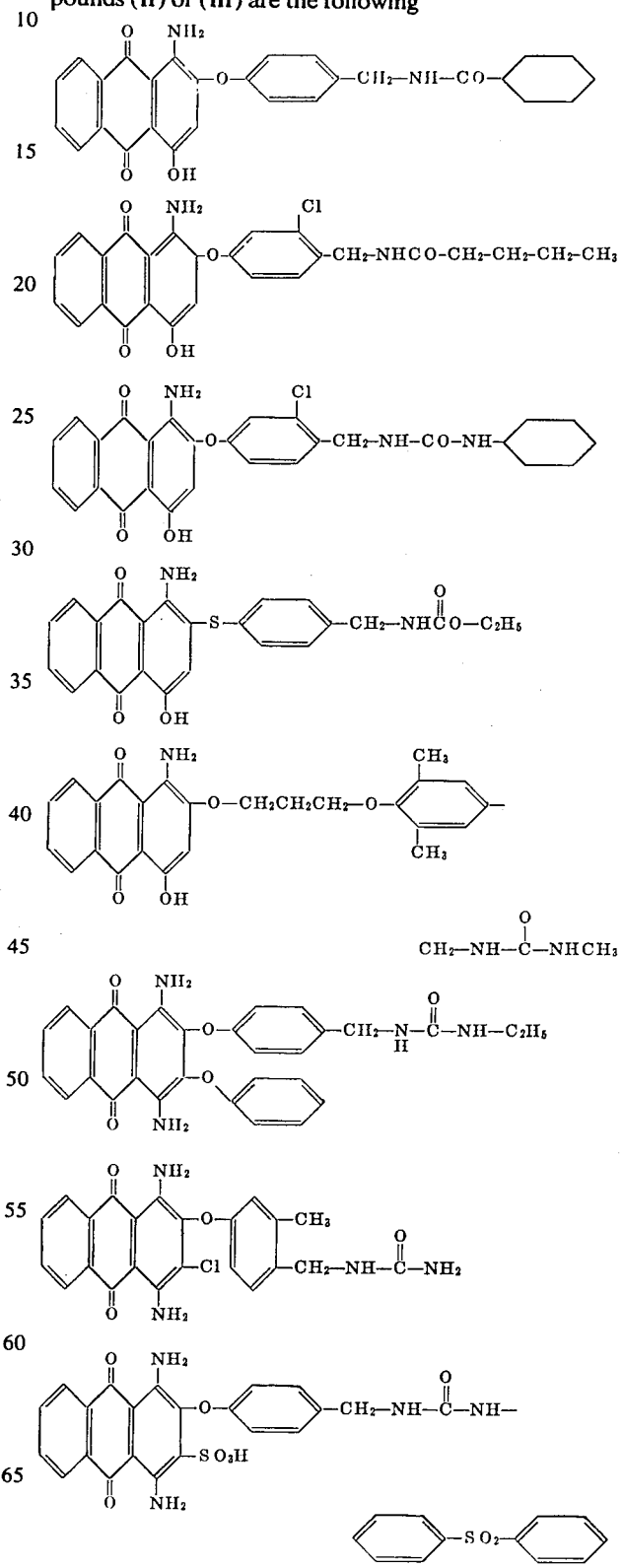

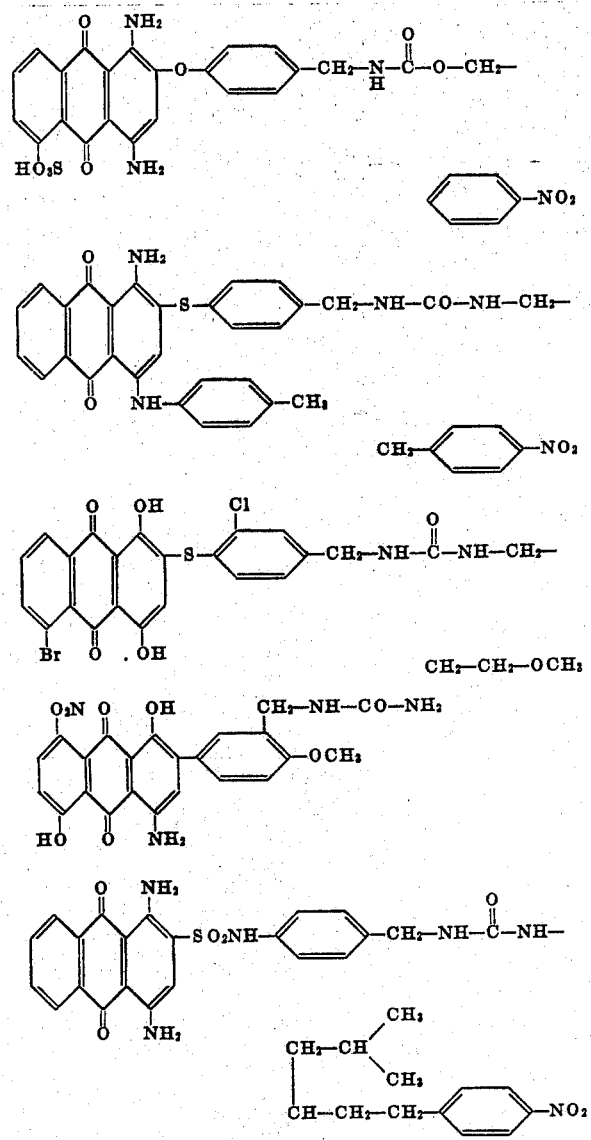

Examples of suitable compounds (IV) are, inter alia: 1-amino-2-aryloxy-4-hydroxy-anthraquinone, 1,4-diamino-2-aryloxy-anthraquinone, 1,4-diamino-2-aryloxy-anthraquinone-3-sulphonic acid, 1,4-diamino-2,3-diaryloxy-anthraquinone, 1,4-diamino-2-aryloxy-3-phenoxy-anthraquinone, 1,4-diamino-2-aryloxy-3-chloro-anthraquinone, 1-amino-2-aryloxy-4-toluene-sulphonylamino-anthraquinone, 1-amino-2-aryloxy-4-arylamino-anthraquinone, 1,4-dialkylamino-2-aryloxy-anthraquinone, 1-amino-2-aryloxy-4-hydroxy-5-bromo-anthraquinone, 1,4-diamino-2-aryloxy-5,8-dihydroxy-anthraquinone, 1,5-diamino-2-aryloxy-4,8-dihydroxy-anthraquinone, 1-amino-2-aryloxy-4-hydroxy-6,7-dichloro-anthraquinone, 1,4-diamino-2-aryloxy-anthraquinone-5-sulphonic acid, 1-amino-3-aryloxy-5-nitro-4,8-dihydroxy-anthraquinone, 1-amino-2-arylthio-4-hydroxy-anthraquinone, 1,4-diamino-2,3-diarylthio-anthraquinone, 1,4-diamino-2-arylthio-anthraquinone-3-sulphonic acid, 1,4-diamino-2-arylamino-anthraquinone, 1-amino-2-phenylethyloxy-4-hydroxy-anthraquinone, 1,4-diamino-2-benzyl-amino-anthraquinone, 1-amino-2-phenylpropylthio-4-hydroxy-anthraquinone, 1-amino-2-(β-phenoxyethyl)-oxy-4-hydroxy-anthraquinone, 1-amino-2-(β-phenylaminobutyl)-oxy-4-hydroxy-anthraquinone, 1,4-diamino-2-arylcarbamido-anthraquinone, 1,4-diamino-2-arylsulphamido-anthraquinone, 1,5-diamino-4,8-dihydroxy-2-aryl-anthraquinone, "aryl" being understood as an unsubstituted phenyl radical, or a phenyl radical which is mono- or polysubstituted by, for example, the groups —Cl, —Br, —NH$_2$, —NHCH$_3$, —NHC$_4$H$_9$, —NH—CH$_2$CH$_2$OH, —N(CH$_3$)$_2$, —NH—C$_6$H$_5$, —NH-COCH$_3$, —NH—COC$_6$H$_5$, NH—SO$_2$—C$_6$H$_5$, —OH, —OCH$_3$, —O—i—C$_4$H$_9$, —O—C$_6$H$_5$, —O—C$_6$H$_9$—SO$_3$H, —S—CH$_3$, —S—C$_4$H$_9$, —S—C$_6$H$_5$, —SO$_2$NH$_2$, —SO$_2$NH—CH$_2$CH$_2$OH, —SO$_2$NH—C$_6$H$_5$, —SO$_2$—C$_6$H$_5$, —SO$_2$—C$_2$H$_5$, C$_1$—C$_4$ alkyl radical, which also contains at least one exchangeable hydrogen atom.

Examples of suitable compounds (VII) are the following:

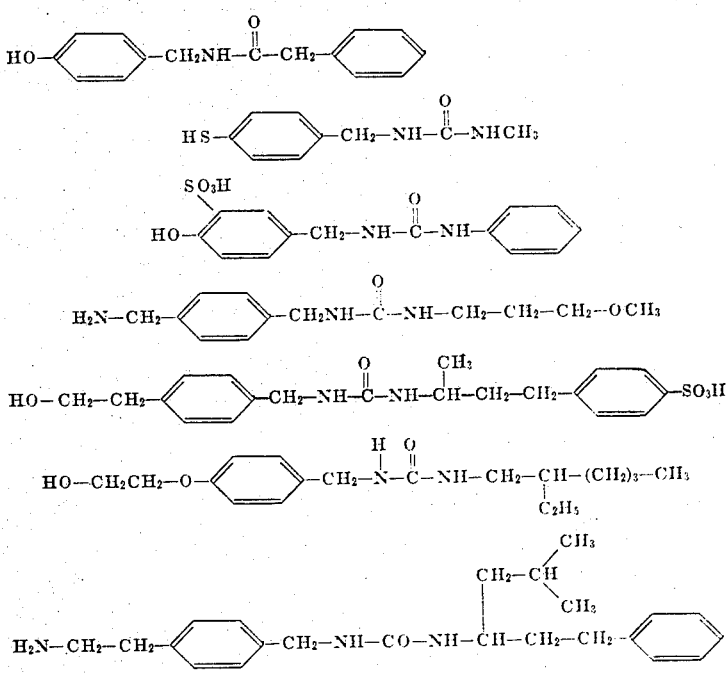

Examples of the methylolamides of the formula (V) or derivatives reacting in the same way are inter alia:

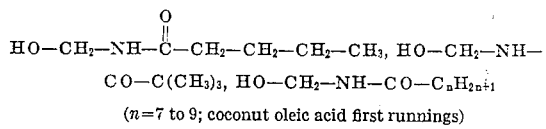

($n$ = 7 to 9; coconut oleic acid first runnings)

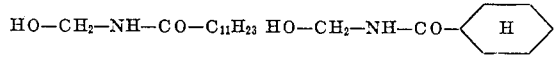

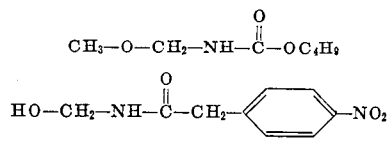

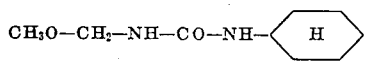

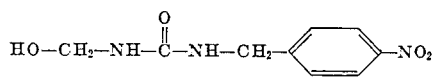

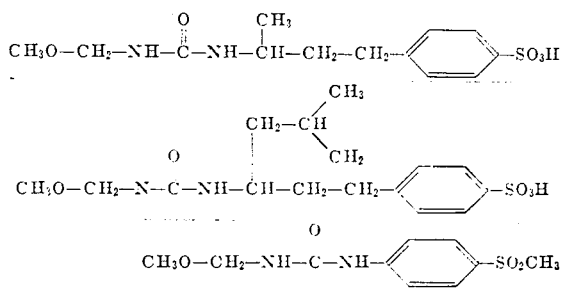

Examples of suitable anthraquinone compounds (VI) are, inter alia:
1-amino-2-bromo-4-hydroxy-anthraquinone, 1-amino-2,4-dibromo-anthraquinone, 1,4-dihydroxy-2-bromo-anthraquinone, 1-amino-2-phenoxy-4-hydroxy-anthraquinone, 1-amino-2-(2′-chlorophenoxy)-4-hydroxy-anthraquinone, 1,4-diamino-2,3-dichloro-anthraquinone, 1,4-diamino-2-phenoxy-3-chloro-anthraquinone, 1,4-diamino-2-phenoxy-anthraquinone-3-sulphonic acid, 1,4-diamino-anthraquinone-2-sulphonic acid chloride, 1,4-diamino-anthraquinone-2-carboxylic acid chloride, 1-amino-2,5-dibromo-4-hydroxy-anthraquinone, 1,4-diamino-2,3,5,8-tetrachloro-anthraquinone.

The new dyestuffs are especially suitable for the dyeing and printing of nitrogen-containing fibers and fabrics, particularly of wool and synthetic polyamides.

The dyeings are especially distinguished by very good fastness to light.

The parts in the following examples are parts by weight; the temperatures are given as degrees centigrade.

EXAMPLE 1

A solution of 80 parts 1-amino-4-hydroxy-2-phenoxy anthraquinone in 800 parts 97 percent sulphuric acid is slowly mixed at 5° to 10° with 65 parts N-methoxymethyl-N′-2-ethyl-hexyl-urea. The temperature is maintained at 25° – 30° until the anthraquinone derivative is completely converted. The reaction mass is then poured on to ice, the product filtered off with suction and washed with water until neutral and dried.

The resultant dyestuff is sulphonated in usual manner at 20° with 20 percent oleum and, after pouring on to ice and salting out with common salts, isolated. The yield amounts to 140 parts of the dyestuff of the formula

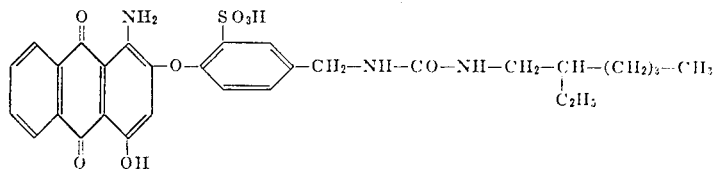

It dyes polyamide fibers and wool from an acidic and neutral bath in bluish red shades of very good fastness properties.

In the procedure is followed as indicated above, but replacing the methoxymethyl-ethylhexyl-urea by equivalent quantities of the following methylol or methoxymethyl compounds: N-methylol-chloro-acetamide, N-methylol-isobutyl-acetamide, N-methylol-dodecane acid amide, the N-methylol derivative of the amides of coconut oleic acid ($C_8$–$C_{10}$) first runnings, N-methylol-hexahydrobenz-amide, N-methoxymethyl-3-p-nitrophenyl-propionic acid amide, N-methylol urethane, N-hydroxymethyl-carbamic acid methyl ester, methylol urea, N-methoxymethyl-N′-methyl-urea, N-methoxymethyl-N′-cyclohexyl-urea, N,N′-bis-methylol urea, N-methoxymethyl-N′-(3-hydroxypropyl)-urea, N-methoxymethyl-N′-(3-methoxypropyl)-urea, N-methoxymethyl-N′-p-methylsulphonylbenzyl-urea, N-methoxymethyl-N′-(4-p-nitrophenyl-butyl-(2))-urea, N-methoxymethyl-N′-(6-p-nitrophenyl-2-methyl-hexyl-(4))-urea, then red dyestuffs are also obtained with good fastness properties.

If 1-amino-4-hydroxy-2-phenoxy-anthraquinone is replaced by the equivalent quantity of 5-chloro-1-amino-4-hydroxy-2-phenoxy-anthraquinone, then there is obtained by the same method of operation the dyestuff of the constitution

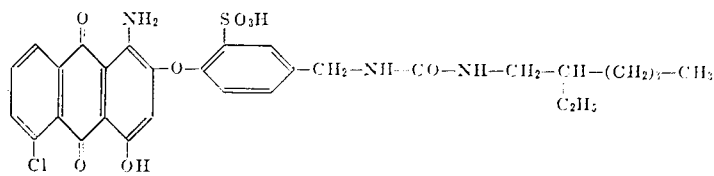

It also dyes polyamide fibers in bluish red shades with good fastness properties.

EXAMPLE 2

Sixteen parts 1-amino-4-hydroxy-2-phenoxy-anthraquinone and 13 parts N-methoxymethyl-carbamic acid-4-nitrobenzyl ester are dissolved at 0° – 5° in 120 parts 96 percent sulphuric acid, and the mixture kept at 20° until the reaction is completed. Sixty parts 65 percent oleum are then added, while cooling, and the mixture is poured on to ice, after complete water-solubility is achieved, the product is filtered off with suction and washed with water containing common salt, until neutral. The resultant dyestuff has the constitution

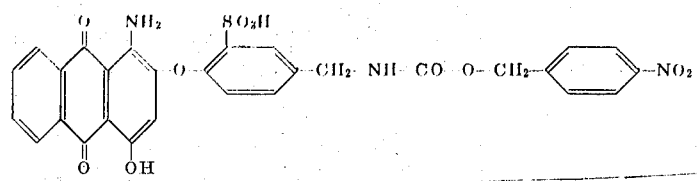

It dyes wool and synthetic polyamide fibers from an acidic and neutral bath in bluish red shades which are particularly fast to wet processing.

When the nitro group of the above dyestuff is reduced to the amino group and the latter acylated, a dyestuff can be obtained by an additional treatment with oleum, which has an improved solubility and the same shade.

When the equivalent quantity of N-methoxymethyl-carbamic acid-6-p-nitrophenyl-3methylhexyl-(4)- or N-methoxymethyl-carbamic acid-isononyl- or 2,2-dimethyloctyl- or 2,2-dimethyldecyl-ester is used, instead of the corresponding nitrobenzyl ester mentioned in the first paragraph of this example, dyestuffs are obtained which dye wool and synthetic polyamide fibers in bluish red shades which are also very fast to wet processing.

EXAMPLE 3

Twenty-one parts 1,4-diamino-2,3-diphenoxy-anthraquinone are introduced at a temperature of 0° – 5° into 150 parts 96 percent sulphuric acid followed by the addition at 0° – 15° of 20 parts N-methoxymethyl-N'-ethyl urea. The mixture is stirred at 20° for 20 hours, then cooled to 0° and 100 parts 65 oleum are run in. The mixture is stirred at 20° – 25° for a further 5 hours and then poured on to 3,000 parts of ice. The precipitated dyestuff is filtered off with suction, washed first with water, then with a 10 percent common salt solution and finally dried at 60° – 17°. 49 Parts of the dyestuff of the constitution

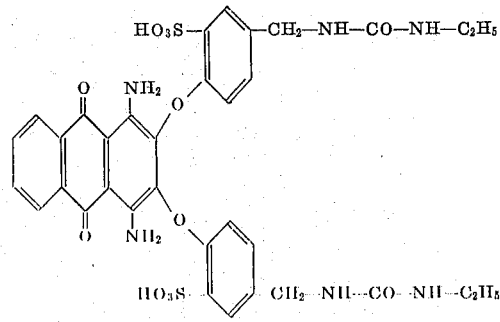

are obtained which dyes synthetic superpolyamide fibers and wool in red-violet shades with good fastness properties.

Valuable-red-violet dyestuffs result likewise when the procedure is followed as described in Example 3, but replacing the methoxymethyl urea there used by equivalent quantities of the following methylol compounds: N-methoxymethyl-N'-[2-ethylhexyl-(1)]-urea, N-methoxymethyl-carbamic acid-4-nitrobenzyl ester, N-methoxymethyl-propionic acid amide.

EXAMPLE 4

Twenty-two parts 1-amino-4-p-toluido-2-phenylmercapto-anthraquinone and 5 parts methylol urea are dissolved at 0° – 5° in 120 parts 96 percent sulphuric acid and the mixture is then warmed up to room temperature. One-hundred parts 65 percent oleum are added after 20 hours, while cooling, and the temperature is maintained at 20° – 25° for a further 5 hours. The mixture is then poured on to ice, the product filtered off with suction, washed with a dilute common salt solution until neutral and dried. The resultant dyestuff has the constitution

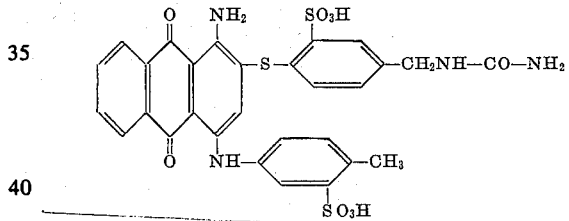

It dyes synthetic polyamide fibers and wool in fast, greenish blue shades.

EXAMPLE 5

Forty-one parts 1,4-diamino-2-phenoxy-anthraquinone-3-sulphonic acid and 35 parts N-methoxymethyl-N'-(4-phenyl-sulphonyl-phenyl)-urea are introduced at 0° into 200 parts 96 percent sulphuric acid. The mixture is stirred at 20° – 25° for 20 hours and then poured on to 3,000 parts of ice. The precipitated dyestuff is filtered off with suction, washed first with water, then with a 5 – 10 percent common salt solution until approximately neutral and dried at 70°. The dyestuff of the constitution

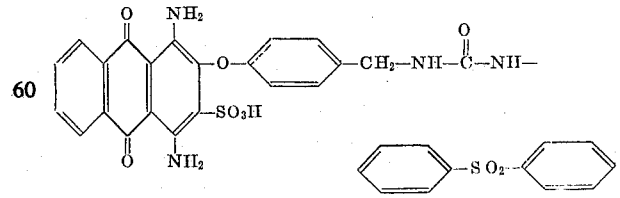

is obtained which dyes synthetic polyamide fibers in blue-violet shades which have a good fastness to light and wet processing.

Fifty parts of the dyestuff of the above formula are introduced at 20° – 25° into 200 parts 10 percent oleum and the mixture is stirred at the same temperature for 4 – 5 hours. It is then poured on to ice, the precipitated dyestuff is filtered off with suction and washed until neutral with a 10 percent common salt solution. The dyestuff of the constitution

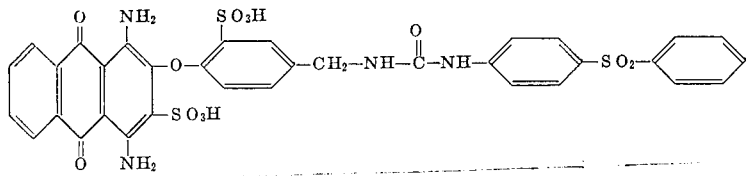

is obtained which dyes polyamide fibers in blue-violet shades of good fastness to light.

When, instead of N-methoxymethyl-N'-(4-phenyl-sulphonyl-phenyl)-urea, equivalent quantities of N-methylol-urea, N-methoxy-methyl-N'-butyl-urea or N-methoxymethyl-N'-[4-p-phenylsulphonyl-phenylbutyl-(2)]-urea are used, dyestuffs are obtained which are similar with respect to shade and light fastness.

EXAMPLE 6

Ninety parts 1-amino-2-phenoxy-4-hydroxy-anthraquinone, 500 parts N-4-(β-hydroxyethyl)-benzyl-N'-benzyl-urea and 20 parts potassium hydroxide are heated at 140° – 150° for 10 hours. The mixture is allowed to cool, poured into water and the product is filtered off with suction. The latter is recrystallized from pyridine and dried. The dry dyestuff is introduced into 250 parts 30 percent oleum and the mixture stirred at 20° – 25° for 5 hours. The mixture is poured on to 5,000 parts of ice, the product is filtered off with suction and washed with water and a common salt solution. After drying, the dyestuff of the constitution

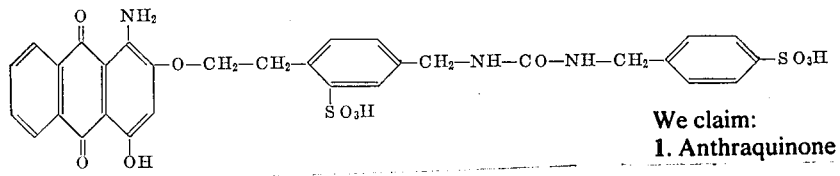

is obtained which dyes synthetic polyamide fibers in red shades of good fastness to light and washing.

EXAMPLE 7

Thirty-five parts 1,5-dihydroxy-4-amino-8-nitro-2-(4'-methoxyphenyl)-anthraquinone are dissolved at 0° – 5° in 300 parts 96 percent sulphuric acid, followed by the addition of 24 parts N-methoxymethyl-N'-butyl-urea. The mixture is stirred at 20° – 25° for 24 hours, 200 parts 65 percent oleum are then run in, and stirring is continued at 30° – 35° for a further 8 hours. The mixture is subsequently poured on to 5,000 parts of ice, the precipitated dyestuff is filtered off with suction, washed first with water, then with a 5 – 10 percent common salt solution, and 43 parts of the dyestuff of the constitution

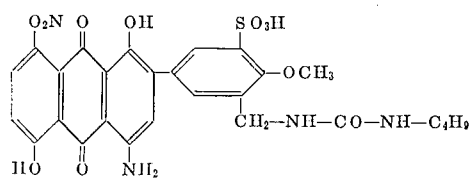

are obtained, which dyes synthetic polyamide fibers in blue shades which are fast to light.

EXAMPLE 8

Four parts of the dyestuff obtained according to Example 1 are introduced into a dyebath of 2,000 parts of water containing 10 parts ammonium acetate, 4 parts glacial acetic acid and 100 parts of a synthetic polyamide fiber hank. The bath is slowly heated to boiling within 30 minutes, and the dyestuff is allowed to draw onto the fiber at boiling temperature in the course of 1 hour. An intense bluish red dyeing is obtained which is especially distinguished by a very good fastness to light.

EXAMPLE 9

Four parts of the dyestuff obtainable according to Example 1 are introduced into a dyebath of 2,000 parts of water which contains 10 parts ammonium acetate, 5 parts glacial acetic acid and 100 parts of a woolen hank. The bath is slowly heated to boiling within 30 minutes, and the dyestuff allowed to draw onto the fiber at boiling temperature within 1 hour. An intense bluish red dyeing is obtained which is especially distinguished by very good fastness to light.

We claim:
1. Anthraquinone dyestuff of the formula

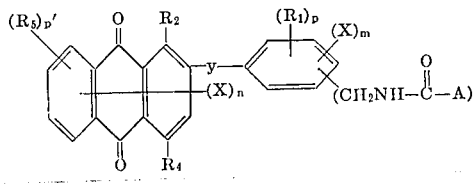

in which Y is —O—, —S—, —O—alkylene, or —O alkylene O—; where alkylene is $CH_2CH_2CH_2$, $CH_2CH_2$, $CH_2$, or $CH_2CH_2CH_2CH_2$ A is selected from the group consisting of amino;
alkylamino with one to 12 carbon atoms in the straight chain or branched carbon chain which may also be unsaturated ; cycloalkylamino with five or six carbon atoms which may contain multiple bonds ;
arylamino radical of the benzene, naphthalene, diphenyl or diphenyl-methane series;
aralkylamino radical which contains in the aromatic part the afore-mentioned aryl radicals and in the aliphatic part one to 12 carbon atoms wherein the aliphatic part may contain multiple bonds ; and one of the said radicals A which carries further substituents selected from the group consisting of alkyl with one to four carbon atoms; halogen; nitro; cyano; hydroxy; alkoxy with one to four carbon atoms; cycloalkyloxy with five or six carbon atoms; phenoxy; phenoxy substituted by halogen, $C_{1-4}$ alkyl, $C_{1-4}$ alkoxy, cyano, nitro, $SO_3H-$ or carboxy; lower alkylsulphonyl groups; phenylsulphonyl; trifloromethyl; carboxylic acid or sulphonic acid groups or their $C_1 - C_6$ alkyl esters wherein the alkyl groups may carry one or more substituents of the class hydroxy and lower alkoxy; amino; mono- or dialkyl-amino containing one to four carbon atoms in the alkyl chain; cycloalkylamino containing five or six carbon atoms; phenyl amino; substituted phenyl amino containing one or more halogen atoms, $C_{1-4}$ alkyl, $C_{1-4}$ alkoxy, cyano, nitro sulphonic acid or carboxyl groups; acylamino where acyl is selected from the class acetyl, propionyl, benzoyl, lower alkylsulphonyl and phenylsulphonyl; phenyl thioether; carboxamide; sulphonamide; and disulphimide, $R_1$, $R_2$, $R_4$ and $R_5$ are selected from the group consisting of H, Halogen, $NO_2$, $NH_2$, OH or NH alkyl containing one to four carbon atoms
NH phenyl
NH acyl where acyl is acetyl, benzoyl, phenylsulfonyl
O alkyl containing one to four carbon atoms
O phenyl
S alkyl containing one to four carbon atoms
S phenyl
$SO_2NH-C_2H_5$
$SO_2NH-$phenyl
$SO_2C_2H_5$
$SO_2-$phenyl
phenyl one of said radicals $R_1$, $R_2$, $R_4$, or $R_5$ which carries, in the alkyl, phenyl, further substituents selected from the group consisting of alkyl with one to four carbon atoms; halogen; nitro; cyano; hydroxy; alkoxy with one to four carbon atoms; cycloalkyloxy with five or six carbon atoms; phenoxy; phenoxy substituted by halogen, $C_{1-4}$ alkyl, $C_{1-4}$ alkoxy; cyano, nitro, $SO_3H-$ or carboxy; lower alkylsulphonyl groups; phenylsulphonyl; trifluoromethyl; carboxylic acid or sulphonic acid groups or their $C_1 - C_6$ alkyl esters wherein the alkyl groups may carry one or more substituents of the class hydroxy and lower alkoxy; amino; mono- or dialkyl-amino containing one to four carbon atoms in the alkyl chain; cycloalkylamino containing five or six carbon atoms; phenyl amino; substituted phenyl amino containing one or more halogen atoms, $C_{1-4}$ alkyl, $C_{1-4}$ alkoxy, cyano, nitro, sulphonic acid or carboxyl groups; acylamino where acyl is selected from the class acetyl, propionyl, benzoyl, lower alkylsulphonyl and phenylsulphonyl; phenyl thioether; carboxamide; sulphonamide; and disulphimide, and wherein $R_1$ can be a lower alkyl radical $N(CH_3)_2$ or $SO_2NH_2$ X is $SO_3H$
$p$ and $p'$ are 1, 2, or 3
and $m$ and $n$ are 0, 1, or 2; the sum of $m$ and $n$ in addition to any $SO_3H$ group in A being at least 1.

2. Anthraquinone dyestuff of the formula in which
Y is $-O-$ or $-S-$;
A is selected from the group consisting of amino; alkylamino with one to 12 carbon atoms in the straight chain or branched carbon chain which may also be unsaturated;
cycloalkylamino with five or six carbon atoms which may contain multiple bonds;
arylamino radical of the benzene, naphthalene, diphenyl or diphenyl-methane series;
aralkylamino radical which contains in the aromatic part the afore-mentioned aryl radicals and in the aliphatic part 1 to 12 carbon atoms wherein the aliphatic part may contain multiple bonds; and
one of the said radicals A which carries further substituents selected from the group consisting of alkyl with one to four carbon atoms; halogen; nitro; cyano; hydroxy; alkoxy with one to four carbon atoms; cycloalkyloxy with five or six carbon atoms; phenoxy; phenoxy substituted by halogen, $C_{1-4}$ alkyl, $C_{1-4}$ alkoxy, cyano, nitro, $SO_3H-$ or carboxy; lower alkylsulphonyl groups; phenylsulphonyl; trifluoromethyl; carboxylic acid or sulphonic acid groups or their $C_1 - C_6$ alkyl esters wherein the alkyl groups may carry one or more substituents of the class hydroxy and lower alkoxy; amino; mono- or dialkyl-amino containing one to four carbon atoms in the alkyl chain; cycloalkylamino containing five or six carbon atoms; phenyl amino; substituted phenyl amino containing one or more halogen atoms, $C_{1-4}$ alkyl, $C_{1-4}$ alkoxy, cyano, nitro, sulphonic acid or carboxyl groups; acylamino where acyl is selected from the class acetyl, propionyl, benzoyl, lower alkylsulphonyl and phenylsulphonyl; phenyl thioether; carboxamide; sulphonamide; and disulphimide, $R_1$, $R_2$, $R_4$ and $R_5$ are selected from the group consisting of H, Halogen, $NO_2$, $NH_2$, OH or NH alkyl containing one to four carbon atoms
NH phenyl
NH acyl where acyl is acetyl, benzoyl, phenylsulfonyl
O alkyl containing one to four carbon atoms
O phenyl
S alkyl containing one to four carbon atoms
S phenyl
$SO_2NH-C_2H_5$
$SO_2NH-$phenyl
$SO_2C_2H_5$
$SO_2-$phenyl phenyl one of said radicals $R_1$, $R_2$, $R_4$, or $R_5$ which carries, in the alkyl, phenyl, further substituents selected from the group consisting of alkyl with one to four carbon atoms; halogen; nitro; cyano; hydroxy; alkoxy with one to four carbon atoms; cycloalkyloxy with five or six carbon atoms; phenoxy; phenoxy substituted by halogen, $C_{1-4}$ alkyl, $C_{1-4}$ alkoxy, cyano, nitro, $SO_3H-$ or carboxy; lower alkylsulphonyl groups; phenylsulphonyl; trifluoromethyl; carboxylic acid or sulphonic acid groups or their $C_1 - C_6$ alkyl esters wherein the alkyl groups may carry one or more substituents of the class hydroxy and lower alkoxy; amino; mono- or dialkyl-amino containing one to four carbon atoms in the alkyl chain; cycloalkylamino containing five or six carbon atoms; phenyl amino; substituted phenyl amino containing one or more halogen atoms, $C_{1-4}$ alkyl, $C_{1-4}$ alkoxy, cyano, nitro, sulphonic acid or carboxyl groups;

acylamino where acyl is selected from the class acetyl, propionyl, benzoyl, lower alkylsulphonyl and phenylsulphonyl; phenyl thioether; carboxamide; sulphonamide; and disulphimide, and wherein $R_1$ can be a lower alkyl radical $N(CH_3)_2$ or $SO_2NH_2$ X is $SO_3H$ $p$ and $p'$ are 1, 2, or 3 and m and n are 0, 1, or 2; the sum of $m$ and $n$ in addition to any $SO_3H$ group in A being at least 1.

3. Dyestuff of claim 2 where A is $NH_2$

NH alkyl with one to eight carbons and

NH alkyl with one to eight carbons and a substituent of the class nitrophenyl, methoxy, sulfophenyl, phenyl, hydroxy, methylsulfonylphenyl and, phenyl sulfonyl phenyl, NH cyclohexyl, NH phenyl and NH phenyl with a substituent of the class phenyl sulfonyl and methylsulfonyl $R_1$ is H, Cl, Br, $NH_2$, $NHCH_3$, $NHC_4H_9$, $NHC_2H_4OH$, $N(CH_3)_2$, $NHC_6H_5$, $NHCOOH_3$, $NHCOC_6H_5$, $NHSO_2C_6H_5$, OH, $OCH_3$, $OC_4H_9$, $OC_6H_5$, $OC_6H_9SO_3H$, $SCH_3$, $SC_4H_9$, $SC_6H_5$, $SO_2NH_2$, $SO_2NHC_2H_4OH$, $SO_2NHC_6HC5$, $SO_2C_6H_5$, $SO_2C_2H_5$, $C_{1-4}$ alkyl $p$ is 0–2

$R_2$ is $NH_2$, OH, $R_4$ is OH, $NH_2$

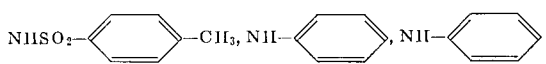

substituted by one or more members of the class Cl, Br, $NH_2$, $NHCH_3$, $NHC_4H_9$, $NHC_2H_4OH$, $N(CH_3)_2$, $NHC_6H_5$, $NHCOOH_3$, $NHCOC_6H_5$, $NHSO_2C_6H_5$, $NHSO_2C_6H_5$, OH, $OCH_3$, $OC_4H_9$,
$OC_6H_5$, $OC_6H_9SO_3H$, $SCH_3$, $SC_4H_9$, $SC_6H_5$, $SO_2NH_2$, $SO_2NHC_2HC4OH$, $SO_2NHC_2H_4OH$, $SO_2NHC_6H_5$, $SO_2C_6H^5 SO_2 C_6H_5 C_{1-4}$ alkyl or is Br $R_5$ is H, OH, $NO_2$, Br, $NH_2$, Cl, $p'$ is 0–2.

4. The anthraquinone dyestuff of claim 1 having the formula

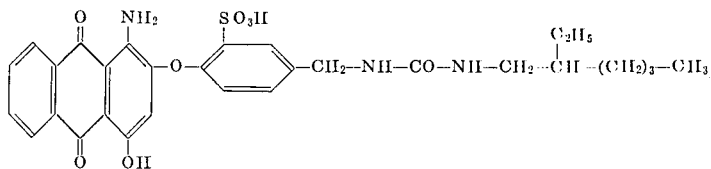

5. The anthraquinone dyestuff of claim 1 having the formula

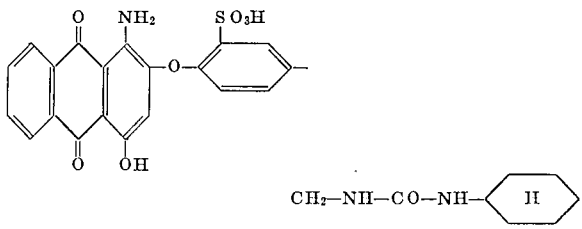

6. The anthraquinone dyestuff of claim 1 having the formula

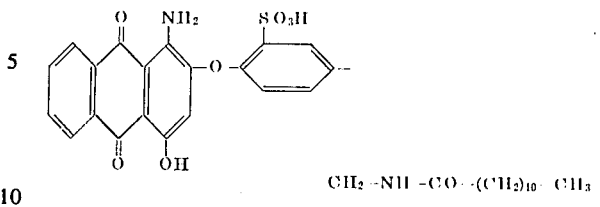

7. The anthraquinone dyestuff of claim 1 having the formula

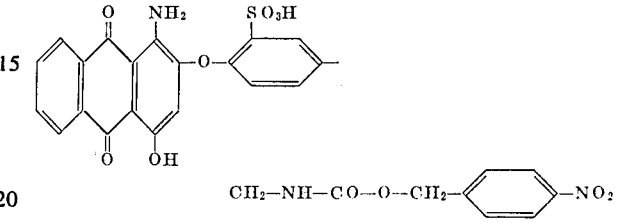

8. The anthraquinone dyestuff of claim 1 having the formula

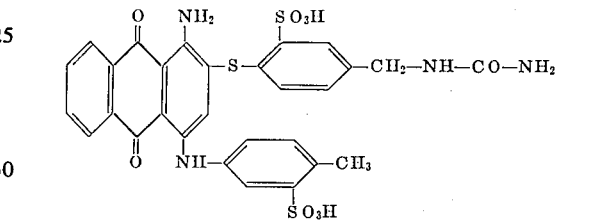

9. The anthraquinone dyestuff of claim 1 having the formula

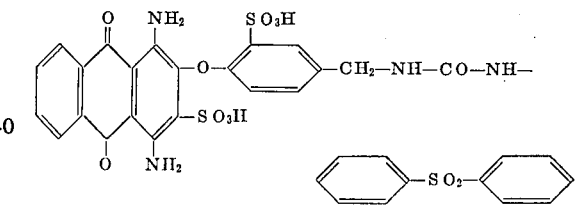

10. The anthraquinone dyestuff of claim 1 having the formula

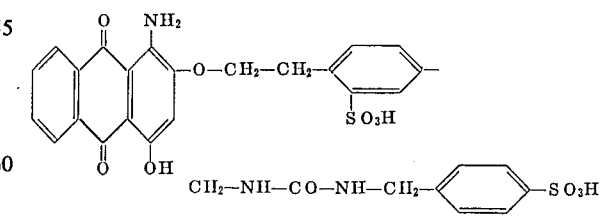

* * * * *